June 14, 1955　　　H. E. SALZMANN　　　2,710,475
LICENSE PLATE HOLDER
Filed Sept. 21, 1954　　　2 Sheets-Sheet 1
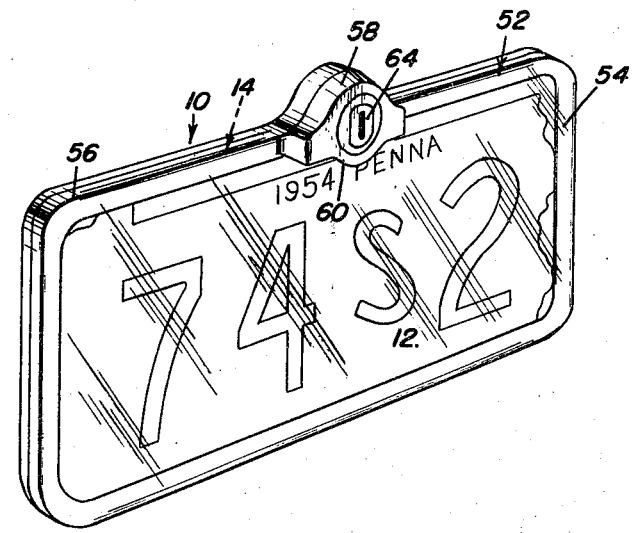
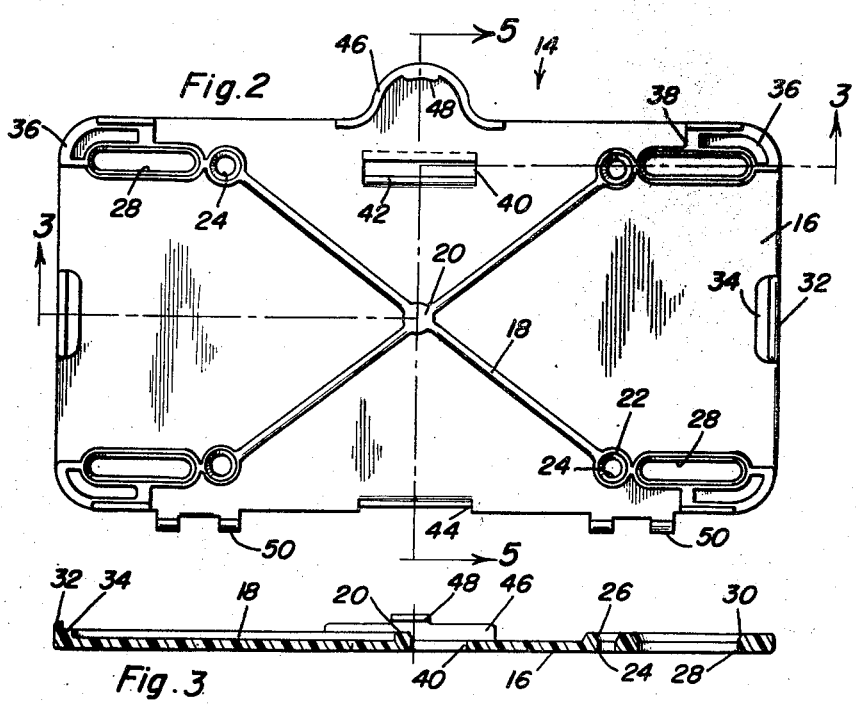
Harry E. Salzmann
INVENTOR.

June 14, 1955  H. E. SALZMANN  2,710,475
LICENSE PLATE HOLDER
Filed Sept. 21, 1954  2 Sheets-Sheet 2
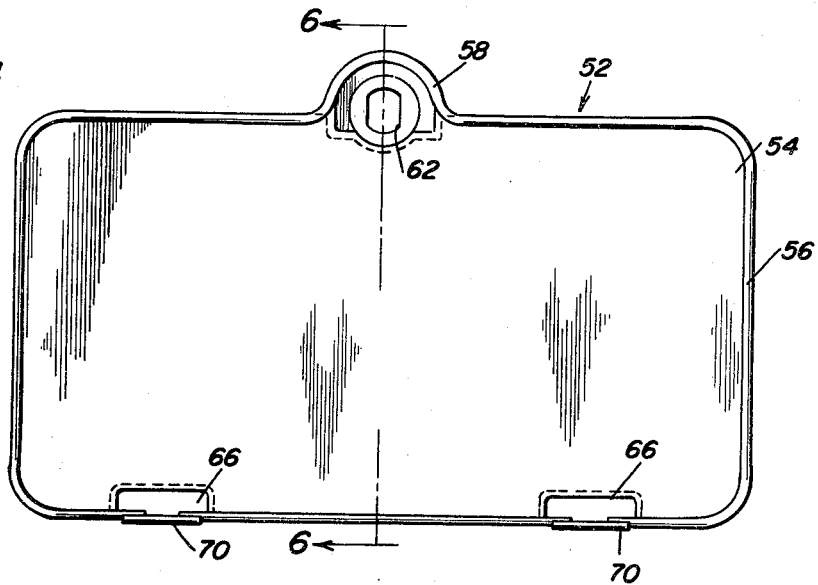
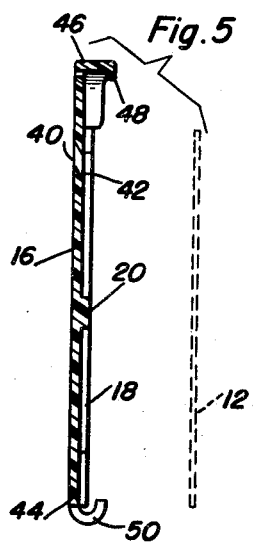
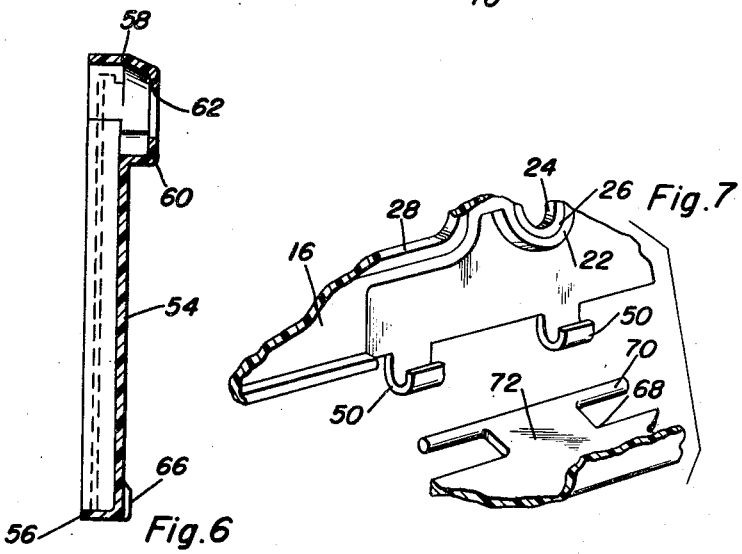
Harry E. Salzmann
INVENTOR.

United States Patent Office 2,710,475
Patented June 14, 1955

2,710,475

LICENSE PLATE HOLDER

Harry E. Salzmann, Reading, Pa., assignor to Jifi Industries, Inc., West Lawn, Pa., a corporation of Pennsylvania Application September 21, 1954, Serial No. 457,324

1 Claim. (Cl. 40—125)

This invention relates to a license plate holder and more specifically presents an improvement in the construction of the license plate holder disclosed in my abandoned application, Serial No. 403,088 filed January 11, 1954.

An object of this invention is to provide a license plate holder for attachment to a vehicle bumper or other portions of a vehicle for prominently displaying the license plate and yet retaining the license plate therein in a loose manner thereby preventing the accidental loss of the license plate and preventing unauthorized removal of the license plate.

Another object of the present invention is to provide a license plate holder constructed of two members normally overlying each other that are pivotally and detachably secured together with a suitable locking mechanism wherein a license plate may be retained between the two members.

A further object of the present invention is to provide a license plate holder conformable to the preceding objects wherein the license plate holder is constructed completely of a transparent plastic or similar materials wherein the device may be easily formed with well known manufacturing procedures such as a simple stamping operation, injection moulding, or the like.

Yet another important object of the present invention is to provide a license plate holder conformable to all of the preceding objects wherein means is provided for simply attaching the device to a vehicle and other means is provided for easily attaching a license plate thereto wherein the license plate may be easily removed or changed.

Yet another important object of the present invention is to provide a license plate holder having a novel detachable hinge for permitting removal of the license plate after the front section has been completely removed from the rear section of the license plate holder.

Other important features of the present invention will be found in its simplicity of construction, ease of attachment, safety, transparency for viewing, its novelty of construction, its adaptability for its purpose and its relative inexpensive manufacture and sale price.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the license plate holder of the present invention with a license plate positioned therein;

Figure 2 is a top elevational view showing the rear member that is attached to the vehicle;

Figure 3 is a plan sectional view taken substantially upon section line 3—3 of Figure 2 showing the details of construction of the peripheral flange, reinforcing ribs, attaching apertures and the locking bolt receiving projection;

Figure 4 is a front elevational view showing the front member of the license plate holder of the present invention;

Figure 5 is a transverse, vertical sectional view taken substantially along section line 5—5 of Figure 2 showing the details of construction of the back member and showing the relationship of the rounded hook members that form one-half of the detachable hinge means;

Figure 6 is a transverse, vertical sectional view taken substantially upon a plane passing along section line 6—6 of Figure 4 showing further structural details of the front member of the license plate holder; and Figure 7 is an enlarged detailed perspective view showing the construction and relationship of the detachable hinge means for complete removal of the front member from the rear member.

Referring now specifically to the drawings, it will be seen that the numeral 10 generally designates the license plate holder of the present invention for attachment to a vehicle (not shown). The license plate holder 10 is provided for retaining a license plate 12 in a readily observable position but yet retains the license plate in a clean position and prevents accidental loss or unauthorized removal of the license plate 12.

Referring now specifically to Figures 2, 3 and 5, it will be seen that the numeral 14 generally indicates a first member or a rear member which includes a generally rectangular plate 16 having radially extending reinforcing ribs 18 on the front surface thereof wherein the reinforcing ribs join at the center of the plate 16 in a reinforcing stud 20. The radial reinforcing ribs 18 terminate in an annular rib 22 that forms a periphery for an opening 24 that is countersunk at its upper end as indicated by the numeral 26. Positioned alongside the opening 24 is an elongated opening 28 which is also countersunk at its upper periphery as indicated by the numeral 30. It will be seen that a pair of openings 24 and 28 are positioned at each corner of the plate 16 and the openings 24 generally form extensions of the radial reinforcing ribs 18 and the openings 28 are positioned alongside and outwardly of the opening 24. It will be understood that either of the openings 24 or 28 may be utilized for securing the license plate 12 to the plate 16. At each remote side edge of the plate 16 is provided a forwardly projecting flange 32 that is provided with a seat 34 for engaging the rear edges of the license plate 12 and each corner of the plate 16 is provided with a projecting flange 36 having a seat 38 thereon wherein the corners of the license plate 12 is rigidly supported on the forward face of the plate 16. Further, the reinforcing ribs 18 will engage and rigidly support the rear surface of the license plate 12 thereby forming a rigid support of the license plate 12.

Centrally of the plate 16 adjacent the upper end thereof is an opening 40 having upwardly tapering top and bottom edges 42 and the lower edge of the plate 16 is provided with a notch 44 wherein an attaching bracket or the like may be secured to the rear plate 16 for attachment to a vehicle in a manner not shown as this does not constitute a part of the present invention. Positioned centrally on the upper edge of the plate 16 is a generally semi-cylindrical projection that projects from the forward face of the plate 16 and terminates on its outer edge with a depending projection 48 for a purpose described hereinafter. As shown in Figure 5, the license plate 12 fits snugly against the forward surface of the plate 16 in slightly spaced relation due to the engagement of the license plate 12 with the seat members 34 and 38 and the reinforcing ribs 18.

Along the lower edge of the plate 16 is positioned two pairs of depending rounded hook members 50 that form an integral extension from the body of the plate 16 and are reversely curved and terminate in spaced relation to the body 16 thereby providing upwardly opening hook members 50 wherein each pair of the hook members 50 is disposed an equal distance from the vertical center line of the plate 16 for a purpose described hereinafter.

Referring now specifically to Figures 4 and 6, it will be seen that the numeral 52 generally designates the second or front member of the license plate holder 10 of the present invention. The front member 52 includes a generally rectangular plate 54 having an inwardly extending peripheral flange 56 extending laterally about the periphery of the plate 54. Positioned at the upper central portion of the plate 54 is an upwardly extending cylindrical portion 58 which extends forwardly or outwardly of the plate 54 as indicated by the numeral 60. The outwardly bulged portion 60 is provided with an opening 62 for receiving a key operated lock 64 that includes a pivotal latch member for engagement behind the projecting flange 48 on the rear member 14. Positioned equal distance from the center of the plate 54 at the lower edge thereof is a pair of reinforcing enlarged areas 66 and the projecting flange 56 is cut away as indicated by the numeral 68 and a pair of cylindrical bars 70 are formed integral with a projecting portion 72 of the flange 56 thereby securing the bars 70 to the plate 54. It will be seen that the bars 70 are spaced apart an equal distance to the two pairs of hooks 50 wherein the bars 70 will pivotally engage the hooks 50 during the outward movement of the front member 54 in relation to the rear member 14. When it is desired to entirely detach the front plate 54 from the rear plate 16, it is only necessary to lift upwardly on the front plate 54 after the lock means 64 has been detached and the front plate 54 pivoted outwardly and downwardly about a horizontal axis formed by the bars or rods 70.

In practical operation, the rear or first member 14 is mounted on a vehicle bumper or other member of the vehicle for ready observance and the license plate 12 is secured thereto by any conventional fastening means such as a screw threaded fastener or the like. The front or second member 52 is positioned with the bars 70 in engagement with the hook members 50 wherein the first member and second member are then in pivotal relation and the second member 52 is brought into overlying engagement with the rear member 14 wherein the peripheral flange 56 on the plate 54 will overlie and overlap the rear plate 16 thereby forming substantially a waterproof license plate holder 10. The lock mechanism 64 may then be actuated for engaging the locking bolt behind the projecting flange 48 thereby securely locking the second member 52 in overlying relation to the first member 14 thereby preventing accidental loss of the license plate 12 as well as unauthorized removal thereof.

It will be seen that both the first member 14 and the second member 52 may be completely constructed of transparent plastic material that may be easily injection moulded, stamped or otherwise formed thereby providing a rigid yet transparent and economically manufactured license plate holder that permits easy removal and changing of the license plate 12 yet prevents accidental loss or unauthorized removal thereof. The first or rear member 14 may be constructed of opaque, grey or any other color of the same quality of plastic material as used in the second or front member 52.

While the license plate 12 is described as being attached to the rear member 14, it will be understood that this invention also includes the loose retention of the license plate between the front and rear members thereby facilitating the changing of the license plate.

Additionally, it is noted that suitable indicia may be provided on the inner surface of the front member 52 for advertisement, safety, or the owners name wherein the indicia may be luminous for reflecting light rays for easy visibility.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A license plate holder for attachment to a vehicle in generally vertical position, said holder comprising a first member having fastener receiving apertures for attachment to the vehicle, said first member having diagonal crossed projecting reinforcing ribs on the surface thereof for engaging the rear of a license plate and forming a rigid support therefor, a second member removably attached to said first member in normally overlying relation, means separably and hingedly interconnecting the lower edges of said members, and releasable lock means retaining the upper edges of said members in adjacent relation for retaining said members in overlying relation and forming an enclosure for a license plate positioned between said members, said second member having a laterally extending peripheral flange for engagement with the first member thereby forming substantially a watertight enclosure, said releasable lock means including a centrally positioned bulged portion on the upper edge of each of said members, said bulged portion on the first member having a depending projection at its outer edge for selectively receiving a pivotal lock bolt, said bulged portion on said second member having an opening therein for providing access to a key-operated lock having a pivotal lock bolt adapted to be received in the bulged portion on the second member, said interconnecting means including two pairs of depending upwardly opening hooks on the lower edge of said first member, and a pair of bars mounted on the lower edge of said second member and spaced therefrom for engagement with said hooks thereby permitting said members to be positioned in overlying engagement, said hooks and bars permitting pivotal and vertical movement of the second member in relation to the first member, said first and second members being entirely of one piece integral construction with the central portion of the second member being transparent for permitting viewing a license plate positioned between said members.

References Cited in the file of this patent

UNITED STATES PATENTS

| | | |
|---|---|---|
| 678,701 | Tuor | July 16, 1901 |
| 1,587,952 | Hartman | June 8, 1926 |
| 1,787,545 | Orester et al. | Jan. 6, 1931 |
| 1,879,906 | Linstrom | Sept. 27, 1932 |
| 1,886,352 | Nickerson | Nov. 1, 1932 |
| 2,361,479 | Joffo | Oct. 31, 1944 |

FOREIGN PATENTS

| | | |
|---|---|---|
| 265,696 | Switzerland | Mar. 16, 1950 |